United States Patent [19]
Webb

[11] 4,445,667
[45] May 1, 1984

[54] ALIGNMENT ADAPTER AND SUPPORT

[76] Inventor: Donald R. Webb, 3500 N. Royston Rd., Potterville, Mich. 48876

[21] Appl. No.: 350,212

[22] Filed: Feb. 19, 1982

[51] Int. Cl.³ .............................................. B66F 5/04
[52] U.S. Cl. ............................ 254/134; 254/DIG. 16
[58] Field of Search ................. 254/133, 134, DIG. 4, 254/DIG. 16; 269/17, 71, 73; 248/178, 310; 414/589, 590, 10, 11

[56] References Cited

U.S. PATENT DOCUMENTS

| | | | |
|---|---|---|---|
| 3,087,630 | 4/1963 | Karnow et al. | 414/590 |
| 3,559,981 | 2/1971 | Abshear | 254/131 |
| 3,958,793 | 5/1976 | Garate | 254/133 R |
| 4,129,291 | 12/1978 | Kato et al. | 269/73 |
| 4,269,394 | 5/1981 | Gray | 254/134 |

Primary Examiner—Robert C. Watson
Attorney, Agent, or Firm—Malcolm R. McKinnon

[57] ABSTRACT

An alignment adapter and support particularly adapted for use with heavy duty jacks, the adapter and support including improved means for aligning and supporting relatively heavy and/or unwieldy components, such as automotive vehicle transmissions, differentials, torque converters and other heavy and/or unwieldy components, and enabling precise alignment of such components with mating components to facilitate installation thereof.

12 Claims, 15 Drawing Figures

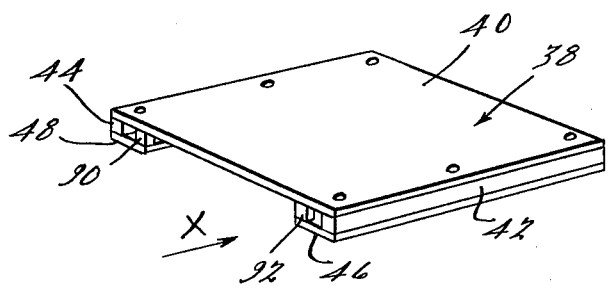
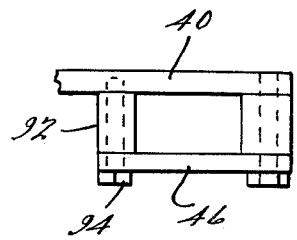
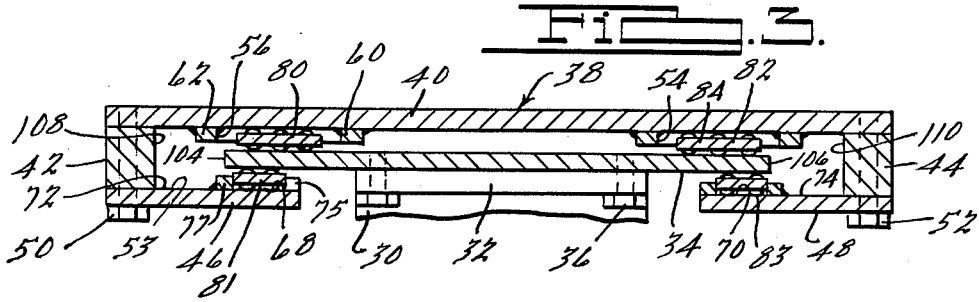
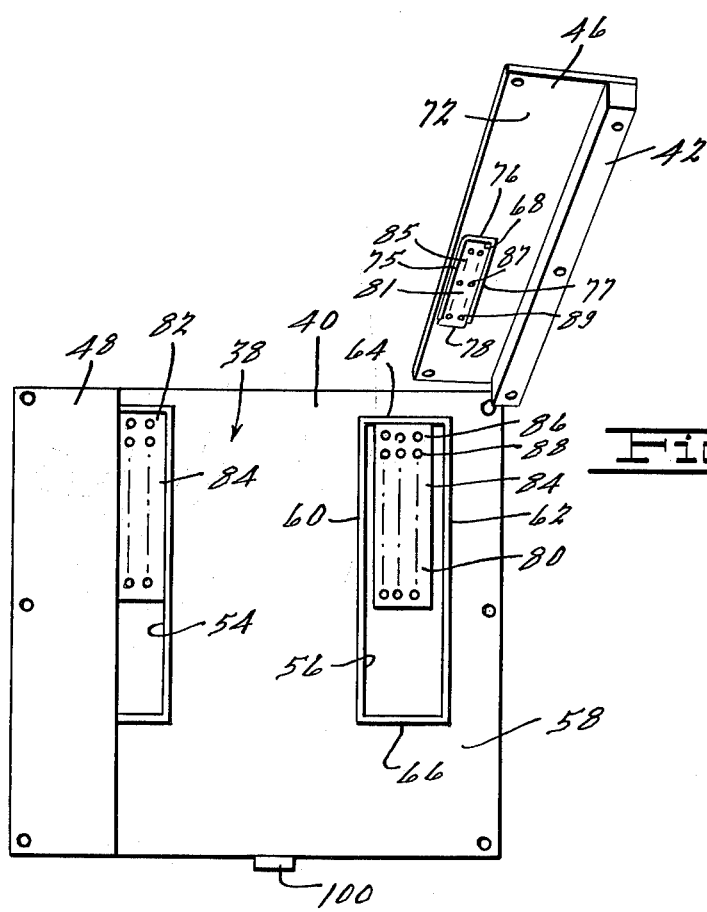

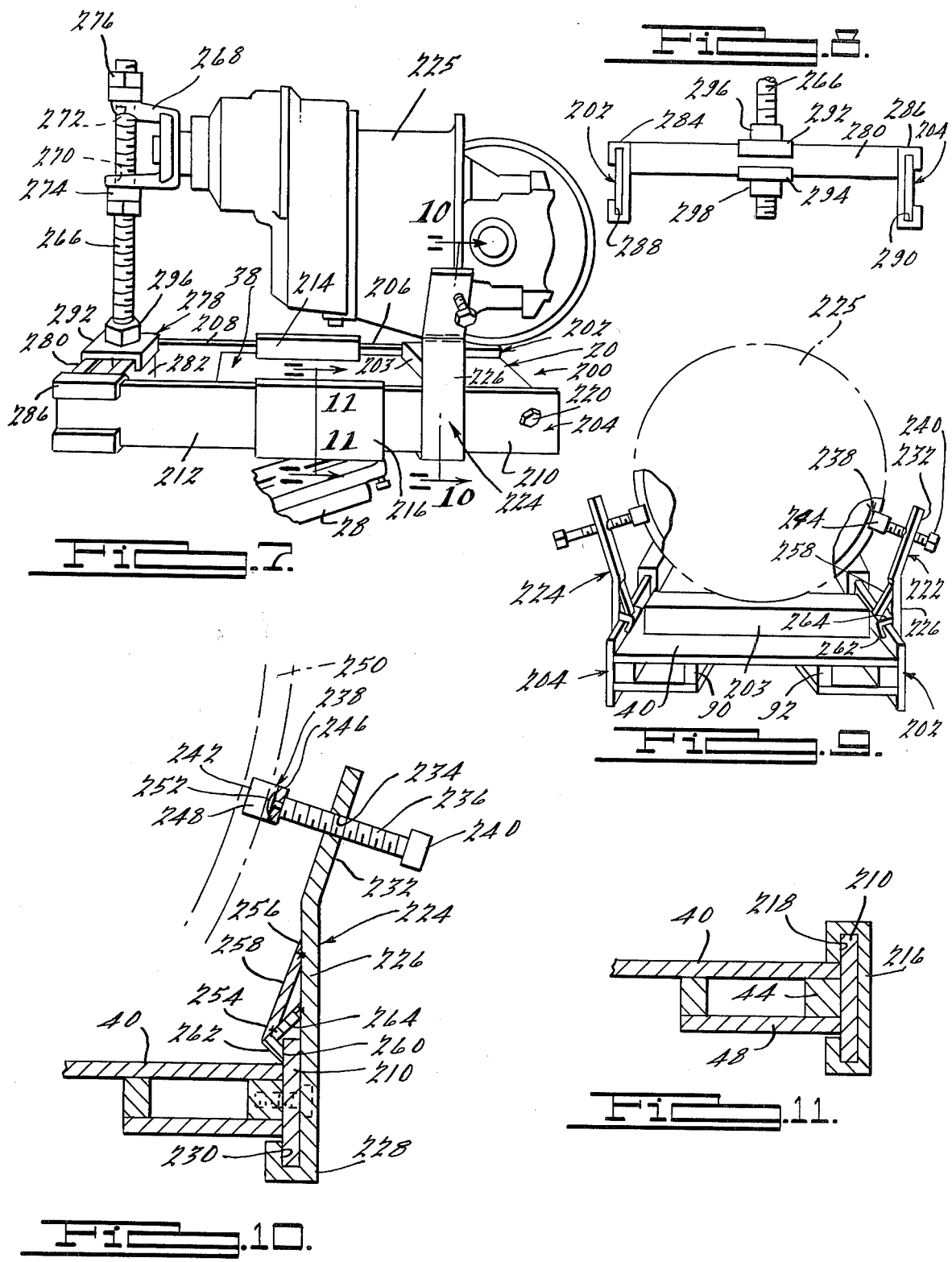

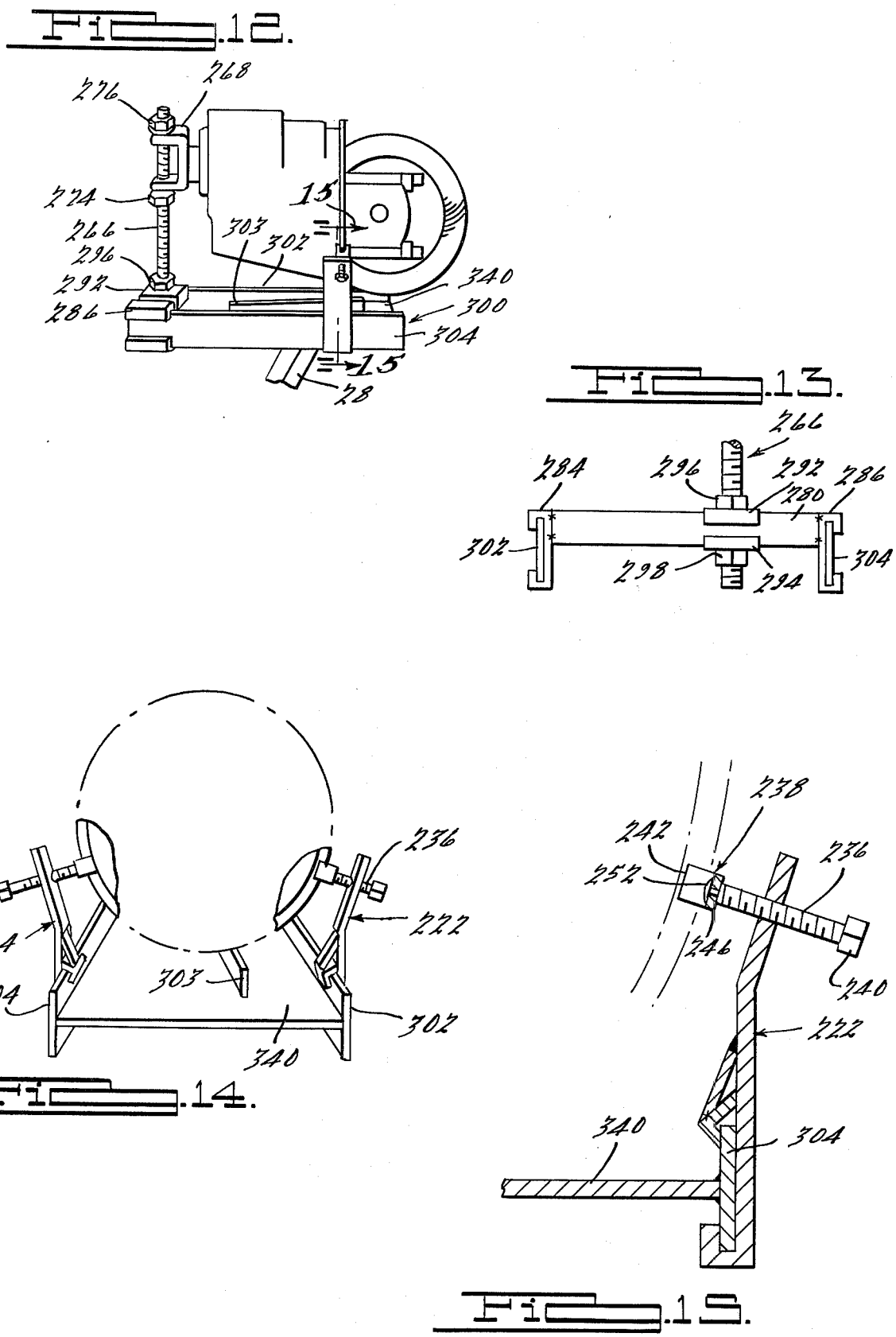

ALIGNMENT ADAPTER AND SUPPORT

BRIEF SUMMARY OF THE INVENTION

This invention relates to alignment adapters and supports and, more particularly, to an improved alignment adapter and support particularly adapted for use with heavy duty jacks, such as conventional caster or wheel mounted mechanical or hydraulic jacks. As is well known in the art, relatively heavy and/or unwieldy automotive vehicle components such as automobile and truck transmissions, differentials, torque converters, fuel tanks, radiators and other relatively heavy and/or unwieldy components often require removal, repair or replacement and subsequent reinstallation during the life of the associated vehicle, and the reinstallation of such components often requires precise alignment of such components with mating components, as for example, the precise alignment of splined shafts with mating components, the precise alignment of bolt holes, or the precise alignment of ports with mating fittings. Heretofore, the usual practice has been to support such components on a conventional heavy duty caster or wheel mounted jack and then manually maneuver the jack to the precise location necessary to effect the desired alignment. However, the floors of automotive garages and other service centers where such installations are usually made are often rough, uneven, tilted, bumpy or pitted, with the result that it is extremely difficult to maneuver manually the jack with the unwieldy component mounted thereon to the precise position required for alignment purposes, and often two or three mechanics are needed to achieve the desired results. In addition, difficulties are often encountered in mounting odd shaped and/or various sized components of the aforementioned types on the jacks.

An object of the present invention is to overcome disadvantages in prior adapters and supporters of the indicated character and to provide an improved alignment adapter and support incorporating improved means for supporting relatively heavy and/or unwieldy components on a jack.

Another object of the present invention is to provide an improved alignment adapter and support incorporating improved means for aligning relatively heavy and/or unwieldy components with associated components.

Another object of the present invention is to provide an improved alignment adapter and support that may be readily mounted on a conventional jack.

Another object of the present invention is to provide an improved alignment adapter and support that may be readily adjusted to accommodate relatively heavy and/or unwieldy components of varying sizes and configurations.

Another object of the present invention is to provide an improved alignment adapter and support which may be utilized to precisely align relatively heavy and/or unwieldy components with associated components without requiring movement, during the final aligning process, of the jack upon which the alignment adapter is mounted.

Another object of the present invention is to provide an improved alignment adapter and support which may be readily installed on and removed from a conventional jack with a minimum of time and labor.

Another object of the present invention is to provide. an improved alignment adapter and support that enables relatively heavy and/or unwieldy components to be moved left and right, forwardly and rearwardly, and angularly with a minimum of manual effort.

Still another object of the present invention is to provide and improved alignment adapter and support that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 3 is a cross sectional view of the structure illustrated in FIG. 2, taken on the line 3—3 thereof;

FIG. 4 is a perspective view of a portion of the structure illustrated in FIG. 2;

FIG. 5 is an enlarged elevational view of a portion of the structure illustrated in FIG. 4 and looking in the direction of the arrow "X";

FIG. 6 is an exploded view of the underside of the structure illustrated in FIG. 4;

FIG. 7 is a perspective view of another embodiment of the present invention and illustrating an automotive vehicle differential mounted thereon;

FIG. 8 is an end elevational view of a portion of the structure illustrated in FIG. 7, taken from the left of FIG. 7;

FIG. 9 is a perspective view of the structure illustrated in FIG. 7, taken from the right of FIG. 7;

FIG. 10 is a sectional view of a portion of the structure illustrated in FIG. 7, taken on the line 10—10 thereof;

FIG. 11 is a sectional view of a portion of the structure illustrated in FIG. 7, taken on the line 11—11 thereof;

FIG. 12 is a perspective view of another embodiment of the invention;

FIG. 13 is an end elevational view of a portion of the structure illustrated in FIG. 12, taken from the left of FIG. 12;

FIG. 14 is a perspective view of the structure illustrated in FIG. 12, taken from the right of FIG. 12; and FIG. 15 is a sectional view of a portion of the structure illustrated in FIG. 12, taken on the line 15—15 thereof.

DETAILED DESCRIPTION

Figure 1:
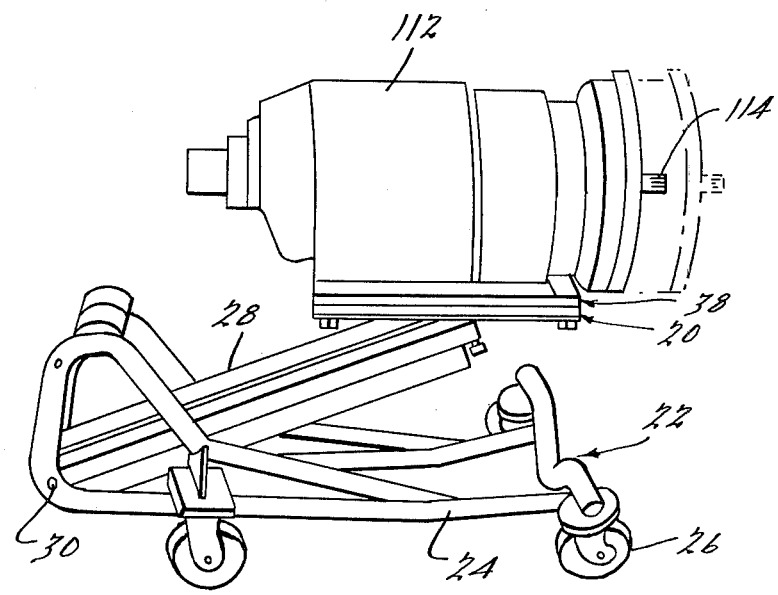
FIG. 1 is a perspective view of an alignment adapter and support embodying the present invention, showing the same mounted on a conventional jack and also illustrating a truck transmission mounted on the alignment adapter.

Referring to the drawings, one embodiment of the invention is disclosed in FIGS. 1 through 6 thereof and is comprised of an alignment adapter and support, generally designated 20, which is particularly adapted for use with conventional heavy duty jacks, such as conventional caster or wheel mounted, mechanical or hydraulic jacks. The alignment adapter and support 20 is illustrated as mounted on a conventional heavy duty jack 22 which includes a chassis 24 mounted on casters 26, the jack 22 also including a lifting member 28 one end portion of which is pivotally connected to the chassis 24, as at 30, while the free end portion of the lifting member 28 carries a conventional lifting head which may be in the form of a flat, substantially rectangular plate 32. Any desired or conventional means, such as hydraulic or mechanical means (not shown), may be utilized to raise and lower the lifting member 28 in a conventional manner.

Figure 2:
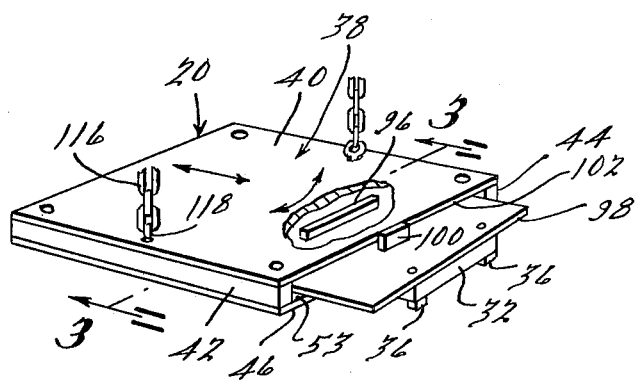
FIG. 2 is a perspective view of the alignment adapter and support illustrated in FIG. 1, showing the same removed from the jack.

The alignment adapter and support 20 is adapted to support and secure relatively heavy and/or unwieldy automotive vehicle components, such as automobile and truck transmissions, differentials, torque converters, fuel tanks, radiators and other relatively heavy and/or unwieldy components while permitting limited longitudinal, lateral and angular movement of such components so as to facilitate installation thereof. The alignment adapter and support 20 is comprised of a flat, substantially rectangular base 34 which is adapted to be secured to the lifting head 32 of the jack through the agency of bolts, such as 36, the shank portions of which pass through the plate 32 and threadably engage the base 34. The alignment adapter and support 20 also includes a carrier 38 which is mounted for limited longitudinal, lateral and angular movement on and relative to the base 34. The carrier 38 is comprised of a generally rectangular support plate 40 which is disposed in spaced substantially parallel relationship with respect to the base 34. The carrier 38 also includes elongate side members 42 and 44 and laterally spaced substantially coplanar bottom flange members 46 and 48, the support member 40 being secured to the side members 42 and 44 and the bottom flange members 46 and 48 through the agency of bolts, such as 50 and 52, the shank portions of which pass through the support member 40, the side members 42 and 44 and the outer edge portions of the bottom flange members 46 and 48 so as to form a unitary structure. With such a construction, the carrier 38 defines a generally T-shaped recess 53 which is open at each end and which is adapted to receive the base 34 as shown in FIGS. 2 and 3.

A pair of laterally spaced, generally rectangular recesses 54 and 56 are provided on the underside 58 of the support plate 40, the recesses 54 and 56 each being defined by ribs or walls 60, 62, 64 and 66 which may be formed of elongate, rectangularly cross sectioned bars that are welded or otherwise fixed to the inner wall 58 of the support member 40. In addition, generally rectangular recesses 68 and 70 are provided on the inner sides 72 and 74, respectively, of the bottom flange members 46 and 48. The area of the recesses 68 and 70 is substantially less than the area of the recesses 54 and 56, the recesses 68 and 70 also being defined by ribs or walls 75, 76, 77 and 78 which may also be formed of elongate bars that are welded to the inner sides 72 and 74 of the bottom flange members 46 and 48. A pair of ball bearing members 80 and 82 are provided each being comprised of a substantially rectangular cage 84 carrying a plurality of ball bearings, such as 86 and 88, the diameter of the ball bearings being greater than the height of the associated cage and also greater than the height of the walls defining the recesses 54 and 56. The rectangular area of the cages 84 is also less than the rectangular area of the recesses 54 and 56 whereby the cages and the ball bearings carried thereby are free to move within the limits of the recesses 54 and 56.

A pair of ball bearing members 81 and 83 are also provided, each being comprised of a substantially rectangular cage 85 carrying a plurality of ball bearings such as 87 and 89, the diameter of the ball bearings 87 and 89 being greater than the height of the associated cage and also greater than the height of the walls defining the recesses 68 and 70. The bearing members 81 and 83 are confined tightly in the recesses 68 and 70 by the walls defining such recesses and do not tend to move in the recesses 68 and 70 in the manner that the ball bearing members 80 and 82 move in the recesses 54 and 56.

As shown in FIG. 3, the carrier 38 is mounted on the base 34 whereby the base is disposed between the bearing members 80 and 82 carried by the support plate 40 and the bearing members 81 and 83 carried by the bottom members 46 and 48 of the carrier 38.

As shown in FIGS. 4 and 5, in order to limit the forward movement of the carrier 38 relative to the base 34, a pair of stop members 90 and 92 are provided which are secured to the inner rear corner portions of the bottom flange members 46 and 48, respectively, as by bolts 94 which pass through the bottom flange members 46 and 48 and the stop members 90 and 92 and threadably engage the support plate 40. The stop members 90 and 92 also assist in tying the bottom flange members 46 and 48 to the support plate 40. In order to limit rearward movement of the carrier 38 relative to the base 34, an abutment stop 96 is provided which is welded or otherwise fixed to the upper surface of the base 34 at a position substantially spaced from the front edge 98 of the base 34. A stop member 100 is also provided which is fixed to the front edge 102 of the support plate 40. With such a construction, forward movement of the carrier relative to the base is limited by the stop members 90 and 92 while the rearward movement of the carrier 38 relative to the base 34 is limited by the stop member 100 and the abutment stop 96.

As illustrated in FIG. 3, the edges 104 and 106 of the base are disposed in inwardly spaced relationship with respect to the inner walls 108 and 110, respectively, of the side members 42 and 44. Consequently, the carrier 38 is free to roll on the bearing members 80, 81, 82 and 83 and to move left and right, forwardly and backwardly, and angularly relative to the base 34 within the limits effected by the stop members 90 and 92, the inner surfaces 108 and 110 of the side members 42 and 44, and the abutment stop 96 and stop member 100.

The carrier 38 and the base 34 are preferably made of steel or other suitable material having sufficient strength to withstand the forces exerted thereon. The bearing race surfaces of the support plate 40 and the base 34 are preferably smooth and, if desired, such bearing race surfaces may be chromium plated or otherwise treated to reduce the frictional forces involved to a minimum.

In FIG. 1 of the drawings, a typical truck transmission 112 is illustrated resting on the carrier 38, the truck transmission having a splined shaft 114 which projects forwardly therefrom and which must be precisely aligned with a mating component during installation of the transmission. If desired, the transmission 112 may be secured to the carrier 38 through the agency of a chain 116 having the opposite end portions thereof connected to eye bolts such as 118 the shank portions of which pass through the side portions of the carrier 38 and are retained by conventional nuts that threadably engage the shank portion of the eye bolts. In the operation of this embodiment of the invention, the transmission 112 (or other unwieldy component) is mounted on the upper surface of the support plate 40 of the carrier 38 after which the jack 22 is rolled on the casters 26 to the approximate desired aligned position of the splined shaft 114 relative to the mating component. Thereafter, the transmission 112 and the splined shaft 114 may be moved to the precise desired aligned position by manually moving the carrier either left or right, forwardly or backwardly, or angularly relative to the base 34 within the limits effected by the stop members 90 and 92, the inner surfaces 108 and 110 of the side members 42 and 44 of the carrier and the abutment stop 96 and stop member 100 so that the spline 114 is precisely aligned with and may be inserted in its associated mating component, such insertion being effected by moving the entire transmission 112 forwardly as illustrated in dotted lines in FIG. 1. The manual movement of the carrier 38 and the transmission 112 carried thereby may be accomplished with a minimum of manual force since the ball bearing members 80, 81, 82 and 83 minimize the frictional forces between the carrier 38 and the base 34.

Another embodiment of the invention is illustrated in FIGS. 7 through 11, this embodiment of the invention being particularly adapted for use in supporting and aligning automobile and truck differentials. This embodiment of the invention is comprised of an alignment adapter and support, generally designated 200, which is also adapted for use with conventional heavy duty jacks, the alignment adapter 200 being illustrated in FIG. 7 as mounted on the lifting member 28 of the jack 22 as previously described. The alignment adapter 200 includes the entire alignment adapter and support 20 comprising the base 34 and the carrier 38 including the support plate 40, the bearing means and the stop means all as previously described. In addition to the alignment adapter and support 20, the alignment adapter and support 200 includes a pair of side rails 202 and 204, the side rail 202 being comprised of sections 206 and 208 while the side rail 204 is comprised of separate sections 210 and 212. A pair of connecting members 214 and 216 are also provided which define channels such as 218 adapted to receive the inner end portions of the sections 206, 208, 210 and 212. The sections 206 and 210 of the side rails 202 and 204, respectively, are fixed to the side members 42 and 44, respectively, of the carrier 38, as by bolts such as 220. The connectors 214 and 216 are fitted over the inner end portions of the sections 206 and 210, respectively, after which the sections 208 and 212 of the side rails are fitted into the connectors 214 and 216 as illustrated in FIGS. 7, 8, 9 and 11. Thus the sections 206 and 210 are fixed to the side members 42 and 44 of the carrier 38 and the sections 208 and 212 are supported by the connectors 214 and 216.

In this embodiment of the invention, a pair of brackets 222 and 224 are provided for supporting one end portion of a differential 225, the brackets 222 and 224 being adjustably mounted on the sections 206 and 210, respectively. Each of the brackets 222 and 224 is comprised of an upright standard 226, the lower end portion 228 of which defines a channel 230 adapted to slideably receive the lower edge portion of a section 206 or 210. The upper end portion 232 of each standard extends angularly outwardly and defines an internally threaded passageway 234 adapted to receive an externally threaded bolt 236. A generally U-shaped clip 238 is provided on the end of the bolt remote from the head 240 thereof, the clip 238 having parallel, spaced flange portions 242 and 244 integrally joined by a web portion 246 and defining a slot 248 adapted to receive an annular rib 250 conventionally provided on differentials. The web portion 246 of the clip 238 is attached to the shank end of the bolt 236, as by a screw 252 thereby enabling angular adjustment of the clip while inward and outward adjustment of the clip is provided by the bolt 236.

The central portion of the standard 226 is slideably secured to the upper edge portion of the section 206 or 210 through the agency of a generally L-shaped clamp portion 254 provided on each of the brackets 222 and 224, the end 256 of the leg 258 of the clamp portion 254 being welded or otherwise fixed to the central portion of the standard 226 while the free end 260 of the shorter leg 262 of the clamp portion is beveled and adapted to slideably engage the adjacent side of the section 206 or 210 as illustrated in FIGS. 9 and 10. A diagonally extending buttress portion 264 is also provided on each of the brackets 222 and 224, the buttress portion 264 extending angularly between and being welded or otherwise fixed to the clamp portion 254 and the standard portion 226 of the bracket so as to strengthen the assembly. With such a construction, the brackets 222 and 224 may be adjusted to the desired longitudinal position on the sections 206 and 210, respectively, to accommodate differentials of various sizes.

In this embodiment of the invention, an upright, externally threaded stanchion 266 is provided for adjustably supporting the generally U-shaped coupling 268 of the differential 225, the stanchion 266 being adapted to extend through the aligned openings 270 and 272 normally provided in the universal joint coupling of the differential. The stanchion carries a pair of adjustable nuts 274 and 276 which support the coupling 268 at the desired height on the stanchion 266. The lower end portion of the stanchion 266 is supported on the sections 208 and 212 of the side rails 202 and 204 by an adjustable base, generally designated 278, which is comprised of a pair of spaced cross members 280 and 282 which extend in spaced parallel relationship between the sections 208 and 212 and are adjustably mounted thereon through the agency of connecting members 284 and 286 which define channels 288 and 290 adapted to slideably receive the sections 208 and 212. The stanchion 266 is adjustably supported on the cross members 280 and 282 by a pair of channel shaped members 292 and 294 the web portions of which span the cross members 280 and 282 while the flange portions thereof engage the sides of the cross members adjacent thereto. The stanchion extends through the web portions of the members 292 and 294 and through the space between the cross members 280 and 282 and the members 292 and 294 are adjustably clamped to the cross members by means of nuts 296 and 298 which threadably engage the stanchion and bear against the web portions of the members 292 and 294. Thus the stanchion 266 may also be adjusted to accommodate differentials of various sizes.

In the operation of this embodiment of the invention, a differential 225 is mounted on the brackets 222 and 224 and on the stanchion 266 of the alignment adapter and support 200, as previously described and as illustrated in FIGS. 7, 9 and 10, the brackets 222 and 224 and the stanchion 266 being adjustable to accommodate differentials of various sizes as previously described. If desired, a metal or wood block 203 may be inserted between the differential and the plate 40 to assist in supporting the differential. Thereafter, the jack upon which the alignment adapter and support 200 is mounted is rolled to the approximate desired aligned position of the differential relative to its mating component. The differential may be moved to the precise desired aligned position by manually moving the carrier either left or right, forwardly or backwardly, or angularly relative to the base 34 within the limits previously described so that the differential is precisely aligned with and may be assembled with its associated mating components. The manual movement of the differential may be accomplished with a minimum of manual effort since the ball bearing members 80, 81, 82 and 83 minimize the frictional forces between the carrier 38 and the base 34.

Another embodiment of the invention is illustrated in FIGS. 12 through 15, this embodiment of the invention also being adapted for use in supporting and aligning automobile and truck differentials. This embodiment of the invention is comprised of an alignment adapter and support, generally designated 300, which is also adapted for use with conventional heavy duty jacks and wherein the floor of the garage or service center is sufficiently smooth to permit easy rolling of the jack. In this embodiment of the invention, a generally rectangular support plate 340 is provided which is fixed, as by bolts, directly to the lifting head or plate 32 of the jack, and the base 34, the side members 42 and 44, the bottom flange members 46 and 48, the bearing members 80 and 82, and the stop members 90, 92, 96 and 100 are eliminated. In this embodiment of the invention the alignment adapter 300 includes a pair of elongate side rails 302 and 304 each of which is preferably formed in one piece, and the side rails 302 and 304 are fixed to the side edges of the support plate 340 by any suitable means. In this embodiment of the invention, the brackets 222 and 224, previously described in detail, are adjustably mounted on the side rails 302 and 304 in the same manner as they are mounted on the side rails 202 and 204 as previously described. Also in this embodiment of the invention the stanchion 266 is adjustably mounted on the side rails 302 and 304 in the same manner that the stanchion is mounted on the side rails 202 and 204 as described hereinabove.

In the operation of this embodiment of the invention, a differential is mounted on the brackets 222 and 224 and on the stanchion 266 as previously described and as illustrated in FIGS. 12, 14 and 15. If desired, a metal or wood block 303 may be inserted between the differential and the plate 340 to assist in supporting the differential. Thereafter, the jack itself may be maneuvered to move the differential to the precise desired aligned position so that it may be assembled with its associated mating components.

While preferred embodiments of the invention have been illustrated and described, it will be understood that various changes and modifications may be made without departing from the spirit of the invention.

What is claimed is:

1. An alignment adapter and support for use with a jack having a lifting head, said alignment adapter and support comprising, in combination, a base adapted to be fixed to said lifting head, a carrier, means mounting said carrier on said base, bearing means disposed between said carrier and said base, means limiting longitudinal, lateral and angular movement of said carrier relative to said base, a pair of elongate side rails mounted on opposite sides of said carrier, a pair of brackets, means adjustably mounting said brackets on said side rails, adjustable workpiece engaging means carried by each of said brackets and adapted to support one end portion of a workpiece, adjustable stanchion means supported by said side rails at a position remote from said brackets, and means carried by said stanchion means for supporting the other end portion of a workpiece.

2. The combination as set forth in claim 1 wherein each of said side rails includes separate sections, and means connecting said separate sections of each of said side rails to each other.

3. The combination as set forth in claim 2, said adjustable workpiece engaging means including screw threaded means.

4. An alignment adapter and support for use with a jack having a lifting head, said alignment adapter and support comprising, in combination, a base adapted to be fixed to said lifting head, a carrier, said carrier including a support plate disposed in spaced substantially parallel relationship with respect to said base, said carrier also including a pair of elongate side members and a pair of laterally spaced, coplanar bottom flange members, said side members being fixed to opposite sides of said support plate and said flange members being fixed to said side members to form a unitary structure, a plurality of bearing members said bearing members being disposed between said base and said support plate and between said bottom flange members and said base, means limiting longitudinal, lateral and angular movement of said carrier relative to said base, a pair of elongate side rails mounted on opposite sides of said carrier, means connecting said side rails to said carrier, a pair of brackets, means adjustably mounting said brackets on said side rails, adjustable workpiece engaging means carried by each of said brackets and adapted to support one end portion of a workpiece, adjustable stanchion means supported by said side rails at a position remote from said brackets, and means carried by said stanchion means for supporting the other end portion of a workpiece.

5. The combination as set forth in claim 4 wherein each of said side rails includes separate sections, means connecting said separate sections of each of said side rails to each other, and means connecting one of said sections of each of said side rails to said carrier.

6. An alignment adapter and support for use with a jack having a lifting head, said alignment adapter and support comprising, in combination, a support plate, means for fixing said support plate to said lifting head, a pair of elongate side rails mounted on opposite sides of said support plate, a pair of brackets, means adjustably mounting said brackets on said side rails, adjustable workpiece engaging means carried by each of said brackets and adapted to support one end portion of a workpiece, adjustable stanchion means supported by said side rails at a position remote from said brackets, and means carried by said stanchion means for supporting the other end portion of a workpiece.

7. An alignment adapter and support for use with a jack having a lifting head, said alignment adapter and support comprising, in combination, a flat base adapted to be fixed to said lifting head, a carrier, means including bearing means mounting said carrier on said base for longitudinal, lateral and angular movement relative thereto, said bearing means being disposed between said carrier and said base, means limiting longitudinal, lateral and angular movement of said carrier relative to said base, a pair of elongate side rails mounted on opposite sides of said carrier, a pair of brackets, means slideably mounting said brackets on said side rails and permitting movement of said brackets longitudinally of said rails, adjustable workpiece engaging means carried by each of said brackets and adapted to support one end portion of a workpiece, adjustable stanchion means, means supporting said stanchion means on said side rails at a position remote from said brackets and permitting movement of said stanchion means laterally of said rails, and means carried by said stanchion means for supporting the other end portion of a workpiece.

8. The combination as set forth in claim 7 wherein each of said side rails includes separate sections, and means connecting said separate sections of each of said side rails to each other.

9. The combination as set forth in claim 7, said adjustable workpiece engaging means including an externally threaded bolt, and an angularly adjustable clip carried by said bolt.

10. An alignment adapter and support for use with a jack having a lifting head, said alignment adapter and support comprising, in combination, a flat base adapted to be fixed to said lifting head, a carrier, means mounting said carrier on said base for longitudinal, lateral and angular movement relative thereto, said carrier including a flat support plate disposed in spaced substantially parallel relationship with respect to said base, said carrier also including a pair of elongate side members and a pair of laterally spaced, coplanar bottom flange members, said side members being fixed to opposite sides of said support plate and said flange members being fixed to said side members to form a unitary structure, a plurality of bearing members, said bearing members being disposed between said base and said support plate and between said bottom flange members and said base, means limiting longitudinal, lateral and angular movement of said carrier relative to said base, a pair of elongate side rails mounted on opposite sides of said carrier, means connecting said side rails to said carrier, a pair of brackets, means slideably mounting said brackets on said side rails, adjustable workpiece engaging means carried by each of said brackets and adapted to support one end portion of a workpiece, adjustable stanchion means, means supporting said stanchion means on said side rails at a position remote from said brackets, and means carried by said stanchion means for supporting the other end portion of a workpiece.

11. The combination as set forth in claim 10 wherein each of said side rails includes separate sections, means connecting said separate sections of each of said side rails to each other, and means connecting one of said sections of each of said side rails to said carrier.

12. An alignment adapter and support for use with a jack having a lifting head, said alignment adapter and support comprising, in combination, a flat support plate, means for fixing said support plate to said lifting head, a pair of elongate side rails mounted on opposite sides of said support plate, a pair of brackets, means slideably mounting said brackets on said side rails, adjustable workpiece engaging means carried by each of said brackets and adapted to support one end portion of a workpiece, adjustable stanchion means, means supporting said stanchion means on said side rails at a position remote from said brackets, and means carried by said stanchion means and adjustable relative thereto for supporting the other end portion of a workpiece.

* * * * *